(12) United States Patent
Isogawa et al.

(10) Patent No.: US 9,849,345 B2
(45) Date of Patent: *Dec. 26, 2017

(54) GOLF BALL

(71) Applicant: DUNLOP SPORTS CO. LTD., Kobe-shi, Hyogo (JP)

(72) Inventors: Kazuhiko Isogawa, Kobe (JP); Kosuke Tachibana, Kobe (JP)

(73) Assignee: DUNLOP SPORTS CO. LTD., Kobe-shi, Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/024,105

(22) PCT Filed: Dec. 10, 2014

(86) PCT No.: PCT/JP2014/082646
§ 371 (c)(1),
(2) Date: Mar. 23, 2016

(87) PCT Pub. No.: WO2015/098514
PCT Pub. Date: Jul. 2, 2015

(65) Prior Publication Data
US 2016/0228747 A1    Aug. 11, 2016

(30) Foreign Application Priority Data
Dec. 25, 2013    (JP) .................................. 2013-267230

(51) Int. Cl.
*A63B 37/02*    (2006.01)
*A63B 37/00*    (2006.01)
(Continued)

(52) U.S. Cl.
CPC ........ *A63B 37/0092* (2013.01); *A63B 37/004* (2013.01); *A63B 37/006* (2013.01);
(Continued)

(58) Field of Classification Search
CPC ............ A63B 37/0031; A63B 37/0033; A63B 37/0043; A63B 37/0045; A63B 37/0076; A63B 37/0092
See application file for complete search history.

(56) References Cited

U.S. PATENT DOCUMENTS 5,779,562 A * 7/1998 Melvin ................... C08L 23/08
473/373
6,152,834 A    11/2000 Sullivan
(Continued)

FOREIGN PATENT DOCUMENTS

JP    2001-314530 A    11/2001
JP    2007-319660 A    12/2007
(Continued)

OTHER PUBLICATIONS

International Search Report for PCT/JP2014/082646 (PCT/ISA/210) dated Mar. 17, 2015.
(Continued)

*Primary Examiner* — John E Simms, Jr.
(74) *Attorney, Agent, or Firm* — Birch, Stewart, Kolasch & Birch, LLP (57) ABSTRACT

Provided is a golf ball is excellent in flight distance performance, approach performance, and feel at impact. A ball 2 includes a core 4, a mid layer 6, and a cover 8. The core 4 includes an inner core 10 and an outer core 12. The cover 8 includes an inner layer cover 10 and an outer layer cover 12. An inner core volume Vc, a mid layer volume Vm, a mid layer hardness Hm, an inner layer cover volume Vinc, an inner layer cover hardness Hinc, an outer layer cover volume Vouc, an outer layer cover hardness Houc, and a ball volume V meet the following relational expressions (a) to (g): (a) Vc/V<0.07, (b) Hm>Hinc>Houc, (c) Hm−Houc>25, (d)
(Continued)

Vm>Vinc>Vouc, (e) (Vm+Vinc+Vouc)/V<0.30, (f) Vm/Vouc>1.50, and (g) (Vm*Hm)/(Vouc*Houc)>3.0.

9 Claims, 1 Drawing Sheet

(51) Int. Cl.
    *C08K 3/22* (2006.01)
    *C08K 5/098* (2006.01)
    *C08L 77/00* (2006.01)
(52) U.S. Cl.
    CPC ...... *A63B 37/0029* (2013.01); *A63B 37/0031* (2013.01); *A63B 37/0033* (2013.01); *A63B 37/0039* (2013.01); *A63B 37/0043* (2013.01); *A63B 37/0044* (2013.01); *A63B 37/0045* (2013.01); *A63B 37/0063* (2013.01); *A63B 37/0064* (2013.01); *A63B 37/0076* (2013.01); *C08K 3/22* (2013.01); *C08K 5/098* (2013.01); *C08L 77/00* (2013.01)

(56) References Cited

U.S. PATENT DOCUMENTS

| | | |
|---|---|---|
| 2007/0281801 A1 | 12/2007 | Watanabe et al. |
| 2008/0064526 A1 | 3/2008 | Watanabe et al. |
| 2010/0234138 A1 | 9/2010 | Watanabe et al. |
| 2011/0092315 A1* | 4/2011 | Nakamura ......... A63B 37/0031 473/376 |
| 2011/0159998 A1* | 6/2011 | Ohama ............. A63B 37/0062 473/374 |
| 2011/0300968 A1 | 12/2011 | Ryu et al. |
| 2012/0046132 A1 | 2/2012 | Fitchett et al. |
| 2012/0208654 A1* | 8/2012 | Kamino ............. A63B 37/0003 473/376 |
| 2012/0252604 A1* | 10/2012 | Okabe ................ A63B 37/0063 473/376 |
| 2012/0264542 A1* | 10/2012 | Matsuyama ....... C08G 18/4854 473/374 |
| 2013/0065707 A1* | 3/2013 | Matsuyama ............. C08K 5/09 473/373 |
| 2013/0324313 A1 | 12/2013 | Tachibana et al. |

FOREIGN PATENT DOCUMENTS

| | | |
|---|---|---|
| JP | 2007-319667 A | 12/2007 |
| JP | 2008-68077 A | 3/2008 |
| JP | 2011-255172 A | 12/2011 |
| JP | 2012-40374 A | 3/2012 |
| JP | 2013-244378 A | 12/2013 |

OTHER PUBLICATIONS

Written Opinion of the International Searching Authority for for PCT/JP2014/082646 (PCT/ISA/237) dated Mar. 17, 2015.

* cited by examiner

GOLF BALL

TECHNICAL FIELD

The present invention relates to golf balls. Specifically, the present invention relates to golf balls that include a core, a mid layer, and a cover.

BACKGROUND ART

Golf players' foremost requirement for golf balls is high flight distance performance. In particular, golf players place importance on high flight distance performance upon a shot with a driver. High flight distance performance correlates with the resilience performance of a golf ball. When a golf ball having excellent resilience performance is hit, the golf ball flies at a high speed, thereby achieving a large flight distance.

An appropriate trajectory height is required in order to achieve a large flight distance. A trajectory height depends on a spin rate and a launch angle. With a golf ball that achieves a high trajectory by a high spin rate, a flight distance is insufficient. With a golf ball that achieves a high trajectory by a high launch angle, a large flight distance is obtained. In light of flight distance, a low spin rate and a high launch angle are preferred.

Golf players also place importance on spin performance of golf balls. When a backspin rate is high, the run is short. It is easy for golf players to cause a golf ball, to which backspin is easily provided, to stop at a target point. When a sidespin rate is high, the golf ball tends to curve. It is easy for golf players to intentionally cause a golf ball, to which sidespin is easily provided, to curve. A golf ball to which spin is easily provided has excellent approach performance. In particular, advanced golf players place importance on approach performance upon a shot with a short iron.

Golf players are further interested in feel at impact of golf balls. A hard cover deteriorates feel at impact. Golf players prefer soft feel at impact.

In light of achievement of various performance characteristics, golf balls each having a multilayer structure have been proposed. JP2007-319660 discloses a golf ball that includes a core, an envelope layer, a mid layer, and a cover. The golf ball includes the mid layer that is harder than the envelope layer and the cover. JP2007-319667 and JP2008-68077 also disclose a similar golf ball. JP2011-255172 discloses a golf ball that includes a center portion, a mid layer, and an outer later. The golf ball includes the outer layer that is relatively hard and thick. U.S. Pat. No. 6,152,834 discloses a golf ball that includes a core and a cover composed of at least three layers. In the golf ball, a soft and thick cover is formed as an outermost layer.

CITATION LIST

Patent Literature

Patent Literature 1: JP2007-319660
Patent Literature 2: JP2007-319667
Patent Literature 3: JP2008-68077
Patent Literature 4: JP2011-255172
Patent Literature 5: U.S. Pat. No. 6,152,834

SUMMARY OF THE INVENTION

Problems to be Solved by the Invention

When a golf ball having a high launch angle and a low spin rate is hit with a driver, a large flight distance is obtained. However, a golf ball having a low spin rate has inferior approach performance. In recent years, golf players' requirements for golf balls have been escalated more than ever. A golf ball that achieves both a large flight distance and excellent approach performance on a high level is desired. Furthermore, a golf ball having soft feel at impact upon a shot is desired.

An object of the present invention is to provide a golf ball that has high flight distance performance upon a shot with a driver and excellent approach performance upon a shot with a short iron and provides favorable feel at impact.

Solution to the Problems

A preferable golf ball according to the present invention includes a core, a mid layer positioned outside the core, and a cover positioned outside the mid layer. The core includes an inner core and an outer core positioned outside the inner core. The cover includes an inner layer cover and an outer layer cover positioned outside the inner layer cover. A volume ($mm^3$) of the inner core is defined as Vc; a volume ($mm^3$) of the mid layer is defined as Vm; a Shore D hardness of the mid layer is defined as Hm; a volume ($mm^3$) of the inner layer cover is defined as Vinc; a Shore D hardness of the inner layer cover is defined as Hinc; a volume ($mm^3$) of the outer layer cover is defined as Vouc; a Shore D hardness of the outer layer cover is defined as Houc; and a volume of the entire ball is defined as V. The golf ball meets the following relational expressions (a) to (g):

$$Vc/V<0.07, \quad (a)$$

$$Hm>Hinc>Houc, \quad (b)$$

$$Hm-Houc>25, \quad (c)$$

$$Vm>Vinc>Vouc, \quad (d)$$

$$(Vm+Vinc+Vouc)/V<0.30, \quad (e)$$

$$Vm/Vouc>1.50, \quad (f)$$

and $$(Vm*Hm)/(Vouc*Houc)>3.0. \quad (g)$$

Preferably, the golf ball meets the following relational expression (h):

$$Vouc/V<0.08. \quad (h)$$

Preferably, the hardness Houc is equal to or less than 36. Preferably, the mid layer is formed from a resin composition. Preferably, a principal component of a base resin of the resin composition is selected from an ionomer resin, a polyamide resin, and a mixture thereof.

Preferably, the hardness Hm is equal to or greater than 68. Preferably, a JIS-C hardness Hs at a surface of the core is greater than a JIS-C hardness Ho at a central point of the core. Preferably, a difference (Hs−Ho) between the hardness Hs and the hardness Ho is equal to or greater than 24.

Preferably, the outer core is obtained by a rubber composition being crosslinked. Preferably, the rubber composition includes (A) below.

(A) a fatty acid and/or a fatty acid metal salt

Advantageous Effects of the Invention

In the golf ball, the hardness and the volume of each layer are set in appropriate ranges. When the golf ball is hit with a short iron, the spin rate is high. The golf ball has excellent approach performance. In the golf ball, the resilience performance of the core is not impaired. When the golf ball is hit with a driver, the spin rate is low. The excellent resilience performance and the low spin rate achieve a large flight distance. The feel at impact of the golf ball is soft.

DESCRIPTION OF EMBODIMENTS

The following will describe in detail the present invention, based on preferred embodiments with reference to the accompanying drawing.

Figure 1:
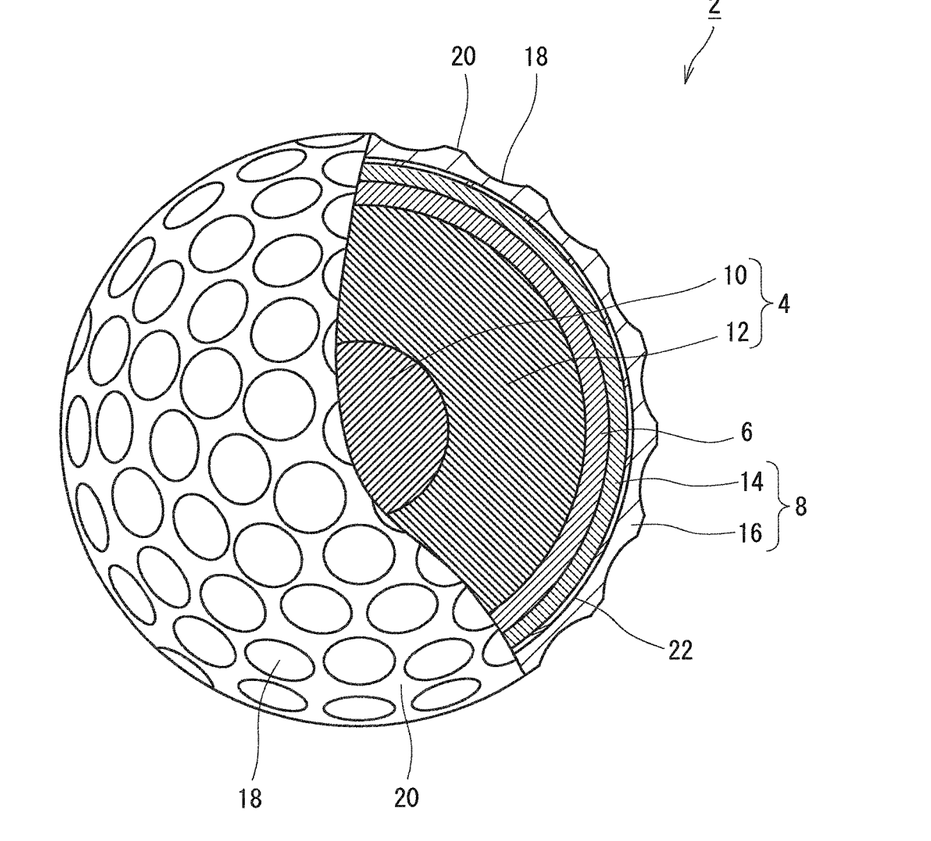
FIG. 1 is a partially cutaway cross-sectional view of a golf ball according to one embodiment of the present invention.

FIG. 1 is a partially cutaway cross-sectional view of a golf ball 2 according to one embodiment of the present invention. The golf ball 2 includes a core 4, a mid layer 6 positioned outside the core 4, and a cover 8 positioned outside the mid layer 6. The core 4 is spherical. The surface of the core 4 is spherical. The surface of the mid layer 6 is spherical.

The core 4 includes an inner core 10 and an outer core 12 positioned outside the inner core 10. The inner core 10 is spherical. The center of the core 4 is the center of the inner core 10. The surface of the core 4 is the outer surface of the outer core 12. The inner surface of the outer core 12 is in contact with the outer surface of the inner core 10. The core 4 is composed of only the inner core 10 and the outer core 12. Another layer may be provided between the inner core 10 and the outer core 12.

The mid layer 6 is formed from a resin composition. In the golf ball 2, the mid layer 6 is formed of a single layer. The mid layer 6 may have a plurality of layers.

The cover 8 includes an inner layer cover 14 and an outer layer cover 16 positioned outside the inner layer cover 14. The inner surface of the inner layer cover 14 is in contact with the outer surface of the mid layer 6. Another layer may be provided between the inner layer cover 14 and the mid layer 6. As described later, in the ball 2, a reinforcing layer 22 is provided between the outer layer cover 16 and the inner layer cover 14. The outer layer cover 16 is covered with a paint layer (not shown). The outer surface of the outer layer cover 16 is in contact with the paint layer.

On the surface of the outer layer cover 16, a large number of dimples 18 are formed. Of the surface of the outer layer cover 16, a part other than the dimples 18 is a land 20. The golf ball 2 includes the paint layer and a mark layer on the external side of the outer layer cover 16, but these layers are not shown in the drawing.

The golf ball 2 has a diameter of 40 mm or greater but 45 mm or less. From the standpoint of conformity to the rules established by the United States Golf Association (USGA), the diameter is preferably equal to or greater than 42.67 mm. In light of suppression of air resistance, the diameter is preferably equal to or less than 44 mm and more preferably equal to or less than 42.80 mm. The golf ball 2 has a weight of 40 g or greater but 50 g or less. In light of attainment of great inertia, the weight is preferably equal to or greater than 44 g and more preferably equal to or greater than 45.00 g. From the standpoint of conformity to the rules established by the USGA, the weight is preferably equal to or less than 45.93 g.

Preferably, the outer core 12 is obtained by crosslinking a rubber composition. Examples of preferable base rubbers for use in the rubber composition include polybutadienes, polyisoprenes, styrene-butadiene copolymers, ethylene-propylene-diene copolymers, and natural rubbers. In light of resilience performance, polybutadienes are preferred. When a polybutadiene and another rubber are used in combination, it is preferred if the polybutadiene is included as a principal component. Specifically, the proportion of the polybutadiene to the entire base rubber is preferably equal to or greater than 50% by weight and more preferably equal to or greater than 80% by weight. The proportion of cis-1,4 bonds in the polybutadiene is preferably equal to or greater than 40% and more preferably equal to or greater than 80%.

Preferably, the rubber composition of the outer core 12 includes a co-crosslinking agent. The co-crosslinking agent achieves high resilience performance of the outer core 12. Examples of preferable co-crosslinking agents in light of resilience performance include monovalent or bivalent metal salts of an $\alpha,\beta$-unsaturated carboxylic acid having 2 to 8 carbon atoms. A metal salt of an $\alpha,\beta$-unsaturated carboxylic acid graft-polymerizes with the molecular chain of the base rubber, thereby crosslinking the rubber molecules. Specific examples of preferable co-crosslinking agents include zinc acrylate, magnesium acrylate, zinc methacrylate, and magnesium methacrylate. Zinc acrylate and zinc methacrylate are particularly preferred on the grounds that high resilience performance is achieved.

As a co-crosslinking agent, an $\alpha,\beta$-unsaturated carboxylic acid having 2 to 8 carbon atoms and a metal compound may also be included. The metal compound reacts with the $\alpha,\beta$-unsaturated carboxylic acid in the rubber composition. A salt obtained by this reaction graft-polymerizes with the molecular chain of the base rubber. Examples of preferable $\alpha,\beta$-unsaturated carboxylic acids include acrylic acid and methacrylic acid.

Examples of preferable metal compounds include metal hydroxides such as magnesium hydroxide, zinc hydroxide, calcium hydroxide, and sodium hydroxide; metal oxides such as magnesium oxide, calcium oxide, zinc oxide, and copper oxide; and metal carbonates such as magnesium carbonate, zinc carbonate, calcium carbonate, sodium carbonate, lithium carbonate, and potassium carbonate. Metal oxides are preferred. Oxides including a bivalent metal are more preferred. An oxide including a bivalent metal reacts with the co-crosslinking agent to form metal crosslinks. Examples of particularly preferable metal oxides include zinc oxide and magnesium oxide.

In light of resilience performance of the golf ball 2, the amount of the co-crosslinking agent in the outer core 12 is preferably equal to or greater than 25 parts by weight and more preferably equal to or greater than 30 parts by weight, per 100 parts by weight of the base rubber. In light of soft feel at impact, the amount of the co-crosslinking agent is preferably equal to or less than 50 parts by weight and more preferably equal to or less than 45 parts by weight, per 100 parts by weight of the base rubber.

Preferably, the rubber composition of the outer core 12 includes an organic peroxide together with the co-crosslinking agent. The organic peroxide serves as a crosslinking initiator. The organic peroxide contributes to the resilience performance of the golf ball 2. Examples of suitable organic peroxides include dicumyl peroxide, 1,1-bis(t-butylperoxy)-3,3,5-trimethylcyclohexane, 2,5-dimethyl-2,5-di(t-butylperoxy)hexane, and di-t-butyl peroxide. In light of versatility, dicumyl peroxide is preferred.

In light of resilience performance of the golf ball 2, the amount of the organic peroxide in the outer core 12 is preferably equal to or greater than 0.1 parts by weight, more preferably equal to or greater than 0.3 parts by weight, and particularly preferably equal to or greater than 0.5 parts by weight, per 100 parts by weight of the base rubber. In light of soft feel at impact, the amount of the organic peroxide is preferably equal to or less than 2.0 parts by weight, more preferably equal to or less than 1.5 parts by weight, and particularly preferably equal to or less than 1.2 parts by weight, per 100 parts by weight of the base rubber.

Preferably, the rubber composition of the outer core 12 includes an organic sulfur compound. Examples of preferable organic sulfur compounds include monosubstitutions such as diphenyl disulfide, bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide, bis(4-cyanophenyl)disulfide, and the like; disubstitutions such as bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl) disulfide, bis(2-cyano-5-bromophenyl)disulfide, and the like; trisubstitutions such as bis(2,4,6-trichlorophenyl)disulfide, bis(2-cyano-4-chloro-6-bromophenyl)disulfide, and the like; tetrasubstitutions such as bis(2,3,5,6-tetrachlorophenyl)disulfide and the like; and pentasubstitutions such as bis(2,3,4,5,6-pentachlorophenyl)disulfide, bis(2,3,4,5,6-pentabromophenyl)disulfide, and the like. Other examples of preferable organic sulfur compounds include thionaphthols such as 2-thionaphthol, 1-thionaphthol, 2-chloro-1-thionaphthol, 2-bromo-1-thionaphthol, 2-fluoro-1-thionaphthol, 2-cyano-1-thionaphthol, 2-acetyl-1-thionaphthol, 1-chloro-2-thionaphthol, 1-bromo-2-thionaphthol, 1-fluoro-2-thionaphthol, 1-cyano-2-thionaphthol, 1-acetyl-2-thionaphthol, and the like; and metal salts thereof. The organic sulfur compound contributes to resilience performance. More preferable organic sulfur compounds are 2-thionaphthol, diphenyl disulfide, and bis(pentabromophenyl)disulfide. A particularly preferable organic sulfur compound is 2-thionaphthol.

In light of resilience performance of the golf ball 2, the amount of the organic sulfur compound per 100 parts by weight of the base rubber is preferably equal to or greater than 0.10 parts by weight, more preferably equal to or greater than 0.15 parts by weight, and particularly preferably equal to or greater than 0.20 parts by weight. In light of resilience performance, the amount is preferably equal to or less than 5.0 parts by weight, more preferably equal to or less than 3.0 parts by weight, and particularly preferably equal to or less than 1.0 parts by weight.

Preferably, the rubber composition of the outer core 12 includes;

(A) a fatty acid and/or a fatty acid metal salt.

The fatty acid and the fatty acid metal salt (A) can react with the aforementioned co-crosslinking agent. During heating and forming of the outer core 12, the fatty acid dissociates and reacts with the cationic component of the co-crosslinking agent. It is thought that within the outer core 12, the fatty acid inhibits formation of the metal crosslinks by the co-crosslinking agent. The acid component included in the fatty acid metal salt exchanges the cationic component with the co-crosslinking agent. It is inferred that during heating and forming of the outer core 12, the fatty acid metal salt breaks the metal crosslinks by the co-crosslinking agent.

In light of reactivity with the co-crosslinking agent, the carbon number of the fatty acid component included in the fatty acid or the fatty acid metal salt (A) is preferably equal to or greater than 1 and more preferably equal to or greater than 4. In light of mixability with the other components in the rubber composition, the carbon number of the fatty acid component is preferably equal to or less than 30, more preferably equal to or less than 20, and particularly preferably equal to or less than 15.

Examples of fatty acids that can be included in the outer core 12 include butyric acid (C4), valeric acid (C5), caproic acid (C6), enanthic acid (C7), caprylic acid (octanoic acid) (C8), pelargonic acid (C9), capric acid (decanoic acid) (C10), lauric acid (C12), myristic acid (C14), myristoleic acid (C14), pentadecylic acid (C15), palmitic acid (C16), palmitoleic acid (C16), margaric acid (C17), stearic acid (C18), elaidic acid (C18), vaccenic acid (C18), oleic acid (C18), linolic acid (C18), linolenic acid (C18), 12-hydroxystearic acid (C18), arachidic acid (C20), gadoleic acid (C20), arachidonic acid (C20), eicosenoic acid (C20), behenic acid (C22), erucic acid (C22), lignoceric acid (C24), nervonic acid (C24), cerotic acid (C26), montanic acid (C28), and melissic acid (C30). Two or more fatty acids may be used in combination. Caprylic acid (octanoic acid), lauric acid, myristic acid, palmitic acid, stearic acid, oleic acid, and behenic acid are preferred.

The fatty acid metal salt includes a metal ion. Examples of the metal ion include sodium ion, potassium ion, lithium ion, silver ion, magnesium ion, calcium ion, zinc ion, barium ion, cadmium ion, copper ion, cobalt ion, nickel ion, manganese ion, aluminum ion, iron ion, tin ion, zirconium ion, titanium ion, and the like. Two or more types of metal ions may be used in combination. Zinc ion and magnesium ion are preferred.

Examples of preferable fatty acid metal salts include potassium salts, magnesium salts, aluminum salts, zinc salts, iron salts, copper salts, nickel salts, and cobalt salts of octanoic acid, lauric acid, myristic acid, palmitic acid, stearic acid, oleic acid, and behenic acid. Zinc salts of fatty acids are particularly preferred. Specific examples of preferable zinc salts of fatty acids include zinc octoate, zinc laurate, zinc myristate, and zinc stearate. A fatty acid and a fatty acid metal salt may be used in combination, or two or more fatty acid metal salts may be used in combination.

In light of suppression of spin, the amount of the fatty acid and/or the fatty acid metal salt (A) per 100 parts by weight of the base rubber is preferably equal to or greater than 0.5 parts by weight, more preferably equal to or greater than 1.0 parts by weight, and particularly preferably equal to or greater than 1.5 parts by weight. In light of resilience performance, the amount is preferably equal to or less than 20 parts by weight, more preferably equal to or less than 15 parts by weight, and particularly preferably equal to or less than 10 parts by weight.

As the co-crosslinking agent, zinc acrylate is preferably used. Zinc acrylate whose surface is coated with stearic acid or zinc stearate for the purpose of improving dispersibility to rubber is present. When the rubber composition includes this zinc acrylate, the stearic acid or zinc stearate coating the zinc acrylate is not included in the concept of the fatty acid and/or the fatty acid metal salt (A).

For the purpose of adjusting specific gravity and the like, a filler may be included in the outer core 12. Examples of suitable fillers include zinc oxide, barium sulfate, calcium carbonate, and magnesium carbonate. Powder of a metal with a high specific gravity may be included as a filler. Specific examples of metals with a high specific gravity include tungsten and molybdenum. The amount of the filler is determined as appropriate so that the intended specific gravity of the outer core 12 is accomplished. A particularly preferable filler is zinc oxide. Zinc oxide serves not only as a specific gravity adjuster but also as a crosslinking activator. According to need, various additives such as sulfur, an anti-aging agent, a coloring agent, a plasticizer, a dispersant, and the like are included in the outer core 12 in an adequate amount. Crosslinked rubber powder or synthetic resin powder may also be included in the outer core 12.

The volume Vr of the outer core 12 can be adjusted as appropriate in consideration of the diameter of the core 4 and the volume Vc of the inner core 10. Preferably, the volume Vr is equal to or greater than 25500 mm$^3$ but equal to or less than 30000 mm$^3$. Preferably, the volume Vr is greater than the volume Vc of the inner core 10. In light of enhancing resilience performance, the ratio (Vr/Vc) is preferably equal to or greater than 10.2. In light of low spin effect, the ratio (Vr/Vc) is preferably equal to or less than 20.0.

Preferably, the inner core 10 is obtained by crosslinking a rubber composition. Examples of preferable base rubbers for use in the rubber composition include polybutadienes, polyisoprenes, styrene-butadiene copolymers, ethylene-propylene-diene copolymers, and natural rubbers. In light of resilience performance, polybutadienes are preferred. When a polybutadiene and another rubber are used in combination, it is preferred if the polybutadiene is included as a principal component. Specifically, the proportion of the polybutadiene to the entire base rubber is preferably equal to or greater than 50% by weight and more preferably equal to or greater than 80% by weight. The proportion of cis-1,4 bonds in the polybutadiene is preferably equal to or greater than 40% and more preferably equal to or greater than 80%.

The rubber composition of the inner core 10 includes a co-crosslinking agent. The co-crosslinking agent achieves high resilience performance of the inner core 10. Examples of preferable co-crosslinking agents in light of resilience performance include monovalent or bivalent metal salts of an α,β-unsaturated carboxylic acid having 2 to 8 carbon atoms. A metal salt of an α,β-unsaturated carboxylic acid graft-polymerizes with the molecular chain of the base rubber, thereby crosslinking the rubber molecules. Specific examples of preferable co-crosslinking agents include zinc acrylate, magnesium acrylate, zinc methacrylate, and magnesium methacrylate. Zinc acrylate and zinc methacrylate are particularly preferred on the grounds that high resilience performance is achieved.

As a co-crosslinking agent, an α,β-unsaturated carboxylic acid having 2 to 8 carbon atoms and a metal compound may also be included. The metal compound reacts with the α,β-unsaturated carboxylic acid in the rubber composition. A salt obtained by this reaction graft-polymerizes with the molecular chain of the base rubber. Examples of preferable α,β-unsaturated carboxylic acids include acrylic acid and methacrylic acid.

Examples of preferable metal compounds include metal hydroxides such as magnesium hydroxide, zinc hydroxide, calcium hydroxide, and sodium hydroxide; metal oxides such as magnesium oxide, calcium oxide, zinc oxide, and copper oxide; and metal carbonates such as magnesium carbonate, zinc carbonate, calcium carbonate, sodium carbonate, lithium carbonate, and potassium carbonate. Metal oxides are preferred. Oxides including a bivalent metal are more preferred. An oxide including a bivalent metal reacts with the co-crosslinking agent to form metal crosslinks. Examples of particularly preferable metal oxides include zinc oxide and magnesium oxide.

In light of resilience performance of the golf ball 2, the amount of the co-crosslinking agent in the inner core 10 is preferably equal to or greater than 25 parts by weight and more preferably equal to or greater than 30 parts by weight, per 100 parts by weight of the base rubber. In light of soft feel at impact, the amount of the co-crosslinking agent is preferably equal to or less than 50 parts by weight and more preferably equal to or less than 45 parts by weight, per 100 parts by weight of the base rubber.

Preferably, the rubber composition of the inner core 10 includes an organic peroxide together with the co-crosslinking agent. The organic peroxide serves as a crosslinking initiator. The organic peroxide contributes to the resilience performance of the golf ball 2. Examples of suitable organic peroxides include dicumyl peroxide, 1,1-bis(t-butylperoxy)-3,3,5-trimethylcyclohexane, 2,5-dimethyl-2,5-di(t-butylperoxy)hexane, and di-t-butyl peroxide. In light of versatility, dicumyl peroxide is preferred.

In light of resilience performance of the golf ball 2, the amount of the organic peroxide in the inner core 10 is preferably equal to or greater than 0.1 parts by weight, more preferably equal to or greater than 0.3 parts by weight, and particularly preferably equal to or greater than 0.5 parts by weight, per 100 parts by weight of the base rubber. In light of soft feel at impact, the amount of the organic peroxide is preferably equal to or less than 2.0 parts by weight, more preferably equal to or less than 1.5 parts by weight, and particularly preferably equal to or less than 1.2 parts by weight, per 100 parts by weight of the base rubber.

Preferably, the rubber composition of the inner core 10 includes an organic sulfur compound. Examples of preferable organic sulfur compounds are the same as the compounds described above for the outer core 12. The organic sulfur compound contributes to resilience performance. More preferable organic sulfur compounds are 2-thionaphthol, diphenyl disulfide, and bis(pentabromophenyl)disulfide. A particularly preferable organic sulfur compound is 2-thionaphthol.

In light of resilience performance of the golf ball 2, the amount of the organic sulfur compound per 100 parts by weight of the base rubber is preferably equal to or greater than 0.10 parts by weight, more preferably equal to or greater than 0.15 parts by weight, and particularly preferably equal to or greater than 0.20 parts by weight. In light of resilience performance, the amount is preferably equal to or less than 5.0 parts by weight, more preferably equal to or less than 3.0 parts by weight, and particularly preferably equal to or less than 1.0 parts by weight.

Preferably, the rubber composition of the inner core 10 includes a fatty acid or a fatty acid metal salt (A). During heating and forming of the inner core 10, the fatty acid dissociates and reacts with the cationic component of the co-crosslinking agent. It is thought that within the inner core 10, the fatty acid inhibits formation of the metal crosslinks by the co-crosslinking agent. The acid component included in the fatty acid metal salt exchanges the cationic component with the co-crosslinking agent. It is inferred that during heating and forming of the inner core 10, the fatty acid metal salt breaks the metal crosslinks by the co-crosslinking agent.

In light of reactivity with the co-crosslinking agent, the carbon number of the fatty acid component included in the fatty acid or the fatty acid metal salt (A) is preferably equal to or greater than 1 and more preferably equal to or greater than 4. In light of mixability with the other components in the rubber composition, the carbon number of the fatty acid component is preferably equal to or less than 30, more preferably equal to or less than 20, and particularly preferably equal to or less than 15.

Examples of fatty acids that can be included in the inner core 10 include butyric acid (C4), valeric acid (C5), caproic acid (C6), enanthic acid (C7), caprylic acid (octanoic acid) (C8), pelargonic acid (C9), capric acid (decanoic acid) (C10), lauric acid (C12), myristic acid (C14), myristoleic acid (C14), pentadecylic acid (C15), palmitic acid (C16), palmitoleic acid (C16), margaric acid (C17), stearic acid (C18), elaidic acid (C18), vaccenic acid (C18), oleic acid (C18), linolic acid (C18), linolenic acid (C18), 12-hydroxystearic acid (C18), arachidic acid (C20), gadoleic acid (C20), arachidonic acid (C20), eicosenoic acid (C20), behenic acid (C22), erucic acid (C22), lignoceric acid (C24), nervonic acid (C24), cerotic acid (C26), montanic acid (C28), and melissic acid (C30). Two or more fatty acids may be used in combination. Caprylic acid (octanoic acid), lauric acid, myristic acid, palmitic acid, stearic acid, oleic acid, and behenic acid are preferred.

The fatty acid metal salt includes a metal ion. Examples of the metal ion include sodium ion, potassium ion, lithium ion, silver ion, magnesium ion, calcium ion, zinc ion, barium ion, cadmium ion, copper ion, cobalt ion, nickel ion, manganese ion, aluminum ion, iron ion, tin ion, zirconium ion, titanium ion, and the like. Two or more types of metal ions may be used in combination. Zinc ion and magnesium ion are preferred.

Examples of preferable fatty acid metal salts include potassium salts, magnesium salts, aluminum salts, zinc salts, iron salts, copper salts, nickel salts, and cobalt salts of octanoic acid, lauric acid, myristic acid, palmitic acid, stearic acid, oleic acid, and behenic acid. Zinc salts of fatty acids are particularly preferred. Specific examples of preferable zinc salts of fatty acids include zinc octoate, zinc laurate, zinc myristate, and zinc stearate. A fatty acid and a fatty acid metal salt may be used in combination, or two or more fatty acid metal salts may be used in combination.

In light of suppression of spin, the amount of the fatty acid or the fatty acid metal salt (A) per 100 parts by weight of the base rubber is preferably equal to or greater than 0.5 parts by weight, more preferably equal to or greater than 1.0 parts by weight, and particularly preferably equal to or greater than 1.5 parts by weight. In light of resilience performance, the amount is preferably equal to or less than 20 parts by weight, more preferably equal to or less than 15 parts by weight, and particularly preferably equal to or less than 10 parts by weight.

For the purpose of adjusting specific gravity and the like, a filler may be included in the inner core 10. Examples of suitable fillers include zinc oxide, barium sulfate, calcium carbonate, and magnesium carbonate. Powder of a metal with a high specific gravity may be included as a filler. Specific examples of metals with a high specific gravity include tungsten and molybdenum. The amount of the filler is determined as appropriate so that the intended specific gravity of the inner core 10 is accomplished. A particularly preferable filler is zinc oxide. Zinc oxide serves not only as a specific gravity adjuster but also as a crosslinking activator. According to need, various additives such as sulfur, an anti-aging agent, a coloring agent, a plasticizer, a dispersant, and the like are included in the inner core 10 in an adequate amount. Crosslinked rubber powder or synthetic resin powder may also be included in the inner core 10.

The volume Vc of the inner core can be adjusted as appropriate such that conditions described later are met. Preferably, the volume Vc is equal to or greater than 1500 mm$^3$ but equal to or less than 2500 mm$^3$.

Preferably, a JIS-C hardness Ho at the central point of the core 4 is equal to or greater than 40 but equal to or less than 70. The core 4 having a hardness Ho of 40 or greater can achieve excellent resilience performance. In this respect, the hardness Ho is more preferably equal to or greater than 50 and particularly preferably equal to or greater than 55. The core 4 having a hardness Ho of 70 or less suppresses excessive spin upon a shot with a driver. In this respect, the hardness Ho is more preferably equal to or less than 65 and particularly preferably equal to or less than 60. The hardness Ho is measured by pressing a JIS-C type hardness scale against the central point of a cut plane of the core 4 that has been cut into two halves. For the measurement, an automated rubber hardness measurement machine (trade name "P1", manufactured by Kobunshi Keiki Co., Ltd.), to which this hardness scale is mounted, is used.

Preferably, a JIS-C hardness Hs at the surface of the core 4 is equal to or greater than 80 but equal to or less than 96. The core 4 having a hardness Hs of 80 or greater suppresses excessive spin upon a shot with a driver. In this respect, the hardness Hs is more preferably equal to or greater than 82 and particularly preferably equal to or greater than 84. Due to the core 4 having a hardness Hs of 96 or less, excellent durability is obtained. In this respect, the hardness Hs is more preferably equal to or less than 94 and particularly preferably equal to or less than 92. The hardness Hs is measured by pressing a JIS-C type hardness scale against the surface of the core 4. For the measurement, an automated rubber hardness measurement machine (trade name "P1", manufactured by Kobunshi Keiki Co., Ltd.), to which this hardness scale is mounted, is used.

Preferably, the hardness Hs is greater than the hardness Ho. In the core 4, an outer-hard/inner-soft structure is formed. In the golf ball 2 including the core 4, a spin rate is suppressed upon a shot with a driver. In this respect, the difference (Hs−Ho) between the hardness Hs and the hardness Ho is preferably equal to or greater than 24, more preferably equal to or greater than 27, and particularly preferably equal to or greater than 30. In light of resilience performance, the difference (Hs−Ho) is preferably equal to or less than 40 and more preferably equal to or less than 35.

The fatty acid or the fatty acid metal salt (A) contributes to the outer-hard/inner-soft structure of the core 4. The outer-hard/inner-soft structure can suppress a spin rate upon a shot with a driver. In light of increasing the difference (Hs−Ho), the above rubber composition of the outer core 12 preferably includes the fatty acid or the fatty acid metal salt (A). In light of further increasing the difference (Hs−Ho), more preferably, the rubber composition of the inner core 10 includes the fatty acid or the fatty acid metal salt (A), and the rubber composition of the outer core 12 includes the fatty acid or the fatty acid metal salt (A).

The rubber composition of the inner core 10 may be the same as the rubber composition of the outer core 12. The rubber composition of the inner core 10 may be different from the rubber composition of the outer core 12. In light of the outer-hard/inner-soft structure of the core 4, the rubber composition of the inner core 10 is preferably different from the rubber composition of the outer core 12. In light of increasing the difference (Hs−Ho), the blending ratio of the co-crosslinking agent included in the rubber composition of the outer core 12 is preferably greater than the blending ratio of the co-crosslinking agent included in the rubber composition of the inner core 10. The blending ratio of the co-crosslinking agent is parts by weight per 100 parts by weight of the base rubber.

In light of resilience performance, the core 4 has a diameter of preferably 37.0 mm or greater, more preferably 37.5 mm or greater, and particularly preferably 38.0 mm or greater. The diameter is preferably equal to or less than 42.0 mm, more preferably equal to or less than 41.0 mm, and particularly preferably equal to or less than 40.2 mm. The core 4 preferably has a weight of 25 g or greater but 42 g or less. The temperature for crosslinking the core 4 is generally equal to or higher than 140° C. but equal to or lower than 180° C. The time period for crosslinking the core 4 is generally equal to or longer than 10 minutes but equal to or shorter than 60 minutes. The core 4 may be formed from two or more layers.

For the mid layer 6, a resin composition is suitably used. Examples of the base resin of the resin composition include ionomer resins, thermoplastic polyester elastomers, thermoplastic polyamide elastomers, thermoplastic polyurethane elastomers, thermoplastic polyolefin elastomers, and thermoplastic polystyrene elastomers.

The mid layer 6 may include a highly elastic resin. Examples of highly elastic resins include polyamide resins, polybutylene terephthalate, polyphenylene ether, polyethylene terephthalate, polysulfone, polyethersulfone, polyphenylene sulfide, polyarylate, polyamide imide, polyetherimide, polyether ether ketone, polyimide, polytetrafluoroethylene, polyamino bismaleimide, polybisamide triazole, polyphenylene oxide, polyacetal, polycarbonate, acrylonitrile-butadiene-styrene copolymers, and acrylonitrile-styrene copolymers.

Preferable base resins in light of resilience performance are ionomer resins or polyamide resins. As described later, the cover of the golf ball 2 is thin. When the golf ball 2 is hit, the mid layer 6 significantly deforms due to the thinness of the cover. Ionomer resins and polyamide resins are highly elastic. The mid layer 6 including an ionomer resin or a polyamide resin contributes to resilience performance. An ionomer resin and a polyamide resin may be mixed and used.

Examples of preferable ionomer resins include binary copolymers formed with an α-olefin and an α,β-unsaturated carboxylic acid having 3 to 8 carbon atoms. A preferable binary copolymer includes 80% by weight or more but 90% by weight or less of an α-olefin, and 10% by weight or more but 20% by weight or less of an α,β-unsaturated carboxylic acid. The binary copolymer has excellent resilience performance. Examples of other preferable ionomer resins include ternary copolymers formed with: an α-olefin; an α,β-unsaturated carboxylic acid having 3 to 8 carbon atoms; and an α,β-unsaturated carboxylate ester having 2 to 22 carbon atoms. A preferable ternary copolymer includes 70% by weight or more but 85% by weight or less of an α-olefin, 5% by weight or more but 30% by weight or less of an α,β-unsaturated carboxylic acid, and 1% by weight or more but 25% by weight or less of an α,β-unsaturated carboxylate ester. The ternary copolymer has excellent resilience performance. For the binary copolymer and the ternary copolymer, preferable α-olefins are ethylene and propylene, while preferable α,β-unsaturated carboxylic acids are acrylic acid and methacrylic acid. A particularly preferable ionomer resin is a copolymer formed with ethylene and acrylic acid or methacrylic acid.

In the binary copolymer and the ternary copolymer, some of the carboxyl groups are neutralized with metal ions. Examples of metal ions for use in neutralization include sodium ion, potassium ion, lithium ion, zinc ion, calcium ion, magnesium ion, aluminum ion, and neodymium ion. The neutralization may be carried out with two or more types of metal ions. Particularly suitable metal ions in light of resilience performance and durability of the golf ball 2 are sodium ion, zinc ion, lithium ion, and magnesium ion.

Specific examples of ionomer resins include trade names "Himilan 1555", "Himilan 1557", "Himilan 1605", "Himilan 1706", "Himilan 1707", "Himilan 1856", "Himilan 1855", "Himilan AM7311", "Himilan AM7315", "Himilan AM7317", "Himilan AM7318", "Himilan AM7329", "Himilan AM7337", "Himilan MK7320", and "Himilan MK7329", manufactured by Du Pont-MITSUI POLYCHEMICALS Co., Ltd.; trade names "Surlyn 6120", "Surlyn 6910", "Surlyn 7930", "Surlyn 7940", "Surlyn 8140", "Surlyn 8150", "Surlyn 8940", "Surlyn 8945", "Surlyn 9120", "Surlyn 9150", "Surlyn 9910", "Surlyn 9945", "Surlyn AD8546", "HPF1000", and "HPF2000", manufactured by E.I. du Pont de Nemours and Company; and trade names "IOTEK 7010", "IOTEK 7030", "IOTEK 7510", "IOTEK 7520", "IOTEK 8000", and "IOTEK 8030", manufactured by ExxonMobil Chemical Corporation. Two or more ionomer resins may be used in combination. An ionomer resin neutralized with a monovalent metal ion, and an ionomer resin neutralized with a bivalent metal ion may be used in combination.

A polyamide resin is a polymer having a plurality of amide bonds (—NH—CO—) in the main chain thereof. Examples of polyamide resins include aliphatic polyamides, aromatic polyamides, amide copolymers, and the like. Examples of aliphatic polyamides include polyamide 6, polyamide 11, polyamide 12, polyamide 66, polyamide 610, polyamide 6T, polyamide 6I, polyamide 9T, polyamide M5T, and polyamide 612. Examples of aromatic polyamides include poly-p-phenylene terephthalamide and poly-m-phenylene isophthalamide. Examples of amide copolymers include polyether block amide copolymers, polyester amide copolymers, polyether ester amide copolymers, and polyamide imide copolymers. The polyamide resin may contain two or more polyamides. Aliphatic polyamides are preferred, and polyamide 6, polyamide 11, and polyamide 12 are particularly preferred. A preferable polyamide resin in light of versatility is nylon 6.

Specific examples of polyamide resins include trade names "Novamid ST220", "Novamid 1010C2", and "Novamid ST145", manufactured by Mitsubishi Engineering-Plastics Corporation; trade name "Pebax 4033SA" manufactured by Arkema Inc.; trade names "UBE Nylon 1018I", "UBE Nylon 1030J", "UBESTA P3014U", "UBESTA 3035JU6", and "UBESTA PAE1200U2", manufactured by Ube Industries, Ltd.; trade names "Zytel FN716" and "Zytel ST811HS" manufactured by E.I. du Pont de Nemours and Company; trade names "Amilan U441", "Amilan U328", and "Amilan U141", manufactured by Toray Industries Inc.; and trade name "Leona 1300S" manufactured by Asahi Kasei Corporation.

When an ionomer resin and a polyamide resin are used in combination, the ionomer resin is preferably included as the principal component of the base polymer. The proportion of the ionomer resin to the entire base polymer is preferably equal to or greater than 50% by weight, more preferably equal to or greater than 65% by weight, and particularly preferably equal to or greater than 70% by weight. The base resin including an ionomer resin and a polyamide resin may further include another resin.

According to need, a coloring agent such as titanium dioxide, a filler such as barium sulfate, a dispersant, an antioxidant, an ultraviolet absorber, a light stabilizer, a fluorescent material, a fluorescent brightener, and the like are included in the resin composition of the mid layer 6 in an adequate amount. Powder of a metal with a high specific gravity may be included as a filler. Specific examples of metals with a high specific gravity include tungsten and molybdenum. The amount of the filler is determined as appropriate so that the intended specific gravity of the mid layer 6 is accomplished.

The thickness Tm of the mid layer 6 can be adjusted as appropriate such that conditions described later for the volume Vm of the mid layer 6 are met. In light of durability, the thickness Tm is preferably equal to or greater than 0.8 mm and more preferably equal to or greater than 0.9 mm. In light of resilience performance, the thickness Tm is preferably equal to or less than 1.4 mm and more preferably equal to or less than 1.2 mm. Preferably, the mid layer 6 has an outer diameter of 39.1 mm or greater but 41.5 mm or less.

The volume Vm of the mid layer 6 can be adjusted as appropriate such that the later-described conditions are met. Preferably, the volume Vm is equal to or greater than 4800 mm$^3$ but equal to or less than 5200 mm$^3$.

In light of suppression of spin upon a shot with a driver, the mid layer 6 has a Shore D hardness Hm of preferably 68 or greater, more preferably 69 or greater, and particularly preferably 70 or greater. In light of feel at impact, the hardness Hm is preferably equal to or less than 80 and more preferably equal to or less than 76.

In the present invention, the hardness Hm of the mid layer 6 is measured according to the standards of "ASTM-D 2240-68". For the measurement, an automated rubber hardness measurement machine (trade name "P1", manufactured by Kobunshi Keiki Co., Ltd.), to which a Shore D type hardness scale is mounted, is used. For the measurement, a sheet that is formed by hot press, is formed from the same material as that of the mid layer 6, and has a thickness of about 2 mm is used. Prior to the measurement, a sheet is kept at 23° C. for two weeks. At the measurement, three sheets are stacked.

For the inner layer cover 14, a resin composition is suitably used. Examples of the base resin of the resin composition include ionomer resins, polystyrenes, polyesters, polyamides, polyolefins, urethane resins, and urea resins.

Particularly preferable base resins are ionomer resins. The ionomer resins described above for the mid layer 6 can be used. The golf ball 2 that includes the inner layer cover 14 containing an ionomer resin has excellent resilience performance.

For the inner layer cover 14, an ionomer resin and another resin may be used in combination. In this case, the principal component of the base resin is preferably the ionomer resin. Specifically, the proportion of the ionomer resin to the entire base resin is preferably equal to or greater than 60% by weight and more preferably equal to or greater than 70% by weight.

An example of the other resin used in combination with the ionomer resin is a styrene block-containing thermoplastic elastomer. The styrene block-containing thermoplastic elastomer includes a polystyrene block as a hard segment, and a soft segment. A typical soft segment is a diene block. Examples of styrene block-containing thermoplastic elastomers include styrene-butadiene-styrene block copolymers (SBS), styrene-isoprene-styrene block copolymers (SIS), styrene-isoprene-butadiene-styrene block copolymers (SIBS), hydrogenated SBS, hydrogenated SIS, and hydrogenated SIBS. Examples of hydrogenated SBS include styrene-ethylene-butylene-styrene block copolymers (SEBS). Examples of hydrogenated SIS include styrene-ethylene-propylene-styrene block copolymers (SEPS). Examples of hydrogenated SIBS include styrene-ethylene-ethylene-propylene-styrene block copolymers (SEEPS).

In light of resilience performance of the golf ball 2, the content of the styrene component in the above thermoplastic elastomer is preferably equal to or greater than 10% by weight, more preferably equal to or greater than 12% by weight, and particularly preferably equal to or greater than 15% by weight. In light of feel at impact of the golf ball 2, the content is preferably equal to or less than 50% by weight, more preferably equal to or less than 47% by weight, and particularly preferably equal to or less than 45% by weight.

In the present invention, styrene block-containing thermoplastic elastomers include an alloy of an olefin and one or more members selected from the group consisting of SBS, SIS, SIBS, and hydrogenated products thereof. The olefin component in the alloy is presumed to contribute to improvement of compatibility with another base polymer. Use of this alloy improves the resilience performance of the golf ball 2. An olefin having 2 to 10 carbon atoms is preferably used. Examples of suitable olefins include ethylene, propylene, butene, and pentene. Ethylene and propylene are particularly preferred. Specific examples of polymer alloys include trade names "Rabalon T3221C", "Rabalon T3339C", "Rabalon SJ4400N", "Rabalon SJ5400N", "Rabalon SJ6400N", "Rabalon SJ7400N", "Rabalon SJ8400N", "Rabalon SJ9400N", and "Rabalon SR04", manufactured by Mitsubishi Chemical Corporation. Other specific examples of styrene block-containing thermoplastic elastomers include trade name "Epofriend A1010" manufactured by Daicel Chemical Industries, Ltd., and trade name "Septon HG-252" manufactured by Kuraray Co., Ltd.

A highly elastic resin may be included in the inner layer cover 14. The highly elastic resins described above for the mid layer 6 can be used.

According to need, a coloring agent such as titanium dioxide, a filler such as barium sulfate, a dispersant, an antioxidant, an ultraviolet absorber, a light stabilizer, a fluorescent material, a fluorescent brightener, and the like are included in the resin composition of the inner layer cover 14 in an adequate amount.

In light of a spin suppression effect upon a shot with a driver, the inner layer cover 14 has a Shore D hardness Hinc of preferably 40 or greater and more preferably 48 or greater. The flight distance of the golf ball 2 is large. In light of approach performance of the golf ball 2, the hardness Hinc is preferably equal to or less than 60 and more preferably equal to or less than 56. When the golf ball 2 is hit with a short iron, the spin rate is high. The hardness Hinc is measured by the same method as that for the hardness Hm.

The thickness Tinc of the inner layer cover 14 can be appropriately adjusted such that a condition described later for the volume Vinc of the inner layer cover 14 is met. Preferably, the thickness Tinc is equal to or greater than 0.5 mm but equal to or less than 1.2 mm. In the golf ball 2 including the inner layer cover 14 having a thickness Tinc of 0.5 mm or greater, the shock by a hit is alleviated, and thus the durability is improved. In this respect, the thickness Tinc is more preferably equal to or greater than 0.7 mm. The golf ball 2 including the inner layer cover 14 having a thickness Tinc of 1.2 mm or less includes a relatively large core 4. The golf ball 2 exerts sufficient resilience performance. In this respect, the thickness Tinc is more preferably equal to or less than 1.0 mm. Preferably, a sphere consisting of the core 4, the mid layer 6, and the inner layer cover 14 has a diameter of 41.5 mm or greater but 42.6 mm or less.

The volume Vinc of the inner layer cover 14 can be appropriately adjusted such that the condition described later is met. Preferably, the volume Vinc is equal to or greater than 3500 mm$^3$ but equal to or less than 4800 mm$^3$.

For forming the inner layer cover 14, known methods such as injection molding, compression molding, and the like can be used.

For the outer layer cover 16, a resin composition is suitably used. A preferable base resin of the resin composition is a urethane resin or a urea resin. A more preferable base resin of the resin composition is a urethane resin. The principal component of the urethane resin is a polyurethane. The polyurethane is flexible. When the golf ball 2 that includes the outer layer cover 16 formed from the resin composition that includes the polyurethane is hit with a short iron, the spin rate is high. The outer layer cover 16 formed from this resin composition contributes to approach performance upon a shot with a short iron. The polyurethane also contributes to scuff resistance of the outer layer cover 16. Furthermore, the polyurethane can contribute to excellent feel at impact when the golf ball 2 is hit with a putter or a short iron.

In light of ease of forming the outer layer cover 16, a preferable base resin is a thermoplastic polyurethane elastomer. The thermoplastic polyurethane elastomer includes a polyurethane component as a hard segment, and a polyester component or a polyether component as a soft segment. Examples of isocyanates for the polyurethane component include alicyclic diisocyanates, aromatic diisocyanates, and aliphatic diisocyanates. Two or more diisocyanates may be used in combination.

Examples of alicyclic diisocyanates include 4,4'-dicyclohexylmethane diisocyanate ($H_{12}MDI$), 1,3-bis(isocyanatomethyl)cyclohexane ($H_6XDI$), isophorone diisocyanate (IPDI), and trans-1,4-cyclohexane diisocyanate (CHDI). In light of versatility and processability, $H_{12}MDI$ is preferred.

Examples of aromatic diisocyanates include 4,4'-diphenylmethane diisocyanate (MDI) and toluene diisocyanate (TDI). Examples of aliphatic diisocyanates include hexamethylene diisocyanate (HDI).

Alicyclic diisocyanates are particularly preferred. Since an alicyclic diisocyanate does not have any double bond in the main chain, the alicyclic diisocyanate suppresses yellowing of the outer layer cover 16. In addition, since an alicyclic diisocyanate has excellent strength, the alicyclic diisocyanate suppresses damage of the outer layer cover 16.

Specific examples of thermoplastic polyurethane elastomers include trade names "Elastollan NY80A", "Elastollan NY82A", "Elastollan NY83A", "Elastollan NY84A", "Elastollan NY85A", "Elastollan NY88A", "Elastollan NY90A", "Elastollan NY97A", "Elastollan NY585", "Elastollan XKP016N", "Elastollan 1195ATR", "Elastollan ET890A", and "Elastollan ET88050", manufactured by BASF Japan Ltd.; and trade names "RESAMINE P4585LS" and "RESAMINE PS62490", manufactured by Dainichiseika Color & Chemicals Mfg. Co., Ltd. From the standpoint that a low hardness of the outer layer cover 16 can be achieved, "Elastollan NY80A", "Elastollan NY82A", "Elastollan NY83A", "Elastollan NY84A", "Elastollan NY85A", "Elastollan NY90A", and "Elastollan NY97A" are particularly preferred.

A thermoplastic polyurethane elastomer and another resin may be used in combination. Examples of the resin that can be used in combination include thermoplastic polyester elastomers, thermoplastic polyamide elastomers, thermoplastic polyolefin elastomers, styrene block-containing thermoplastic elastomers, and ionomer resins. When a thermoplastic polyurethane elastomer and another resin are used in combination, the thermoplastic polyurethane elastomer is included as the principal component of the base polymer, in light of spin performance and scuff resistance. The proportion of the thermoplastic polyurethane elastomer to the entire base polymer is preferably equal to or greater than 50% by weight, more preferably equal to or greater than 70% by weight, and particularly preferably equal to or greater than 85% by weight.

According to need, a coloring agent such as titanium dioxide, a filler such as barium sulfate, a dispersant, an antioxidant, an ultraviolet absorber, a light stabilizer, a fluorescent material, a fluorescent brightener, and the like are included in the outer layer cover 16 in an adequate amount.

The outer layer cover 16 preferably has a Shore D hardness Houc of 36 or less. The golf ball 2 that includes the outer layer cover 16 having a hardness Houc of 36 or less has excellent approach performance. In this respect, the hardness Houc is more preferably equal to or less than 32 and particularly preferably equal to or less than 30. In light of flight distance upon a shot with a driver, the hardness Houc is preferably equal to or greater than 10 and more preferably equal to or greater than 15. The hardness Houc is measured by the same method as that for the hardness Hm and the hardness Hinc.

When the golf ball 2 is hit, the outer layer cover 16 including the polyurethane absorbs the shock. This absorption achieves soft feel at impact. Particularly, when the golf ball 2 is hit with a short iron or a putter, the flexible outer layer cover 16 achieves excellent feel at impact.

The thickness Touc of the outer layer cover 16 can be adjusted as appropriate such that conditions described later for the volume Vouc of the outer layer cover 16 are met. In light of high flight distance performance upon a shot with a driver, the thickness Touc is preferably equal to or less than 0.6 mm. The thickness Touc is more preferably equal to or less than 0.4 mm and particularly preferably equal to or less than 0.3 mm. In light of durability and approach performance, the thickness Touc is preferably equal to or greater than 0.1 mm. The thickness Touc is measured at the land 20.

It should be noted that the volume Vouc includes the volumes of the dimples 18. In calculation of the volume Vouc, the outer surface of the outer layer cover 16 is regarded as a spherical surface including the surface of the land 20.

The volume Vouc of the outer layer cover 16 can be adjusted as appropriate such that the later-described conditions are met. Preferably, the volume Vouc is equal to or greater than 1000 $mm^3$ but equal to or less than 3400 $mm^3$.

For forming the outer layer cover 16, known methods such as injection molding, compression molding, and the like can be used. When forming the outer layer cover 16, the dimples 18 are formed by pimples formed on the cavity face of a mold.

In light of durability, the golf ball 2 that further includes the reinforcing layer 22 between the inner layer cover 14 and the outer layer cover 16 is preferred. The reinforcing layer 22 is positioned between the inner layer cover 14 and the outer layer cover 16. The reinforcing layer 22 firmly adheres to the inner layer cover 14 and also to the outer layer cover 16. The reinforcing layer 22 suppresses separation of the outer layer cover 16 from the inner layer cover 14. The golf ball 2 includes the outer layer cover 16 that is relatively thin. When the thin cover is hit with the edge of a clubface, a wrinkle is likely to occur. The reinforcing layer 22 suppresses occurrence of a wrinkle to improve the durability of the golf ball 2.

As the base polymer of the reinforcing layer 22, a two-component curing type thermosetting resin is suitably used. Specific examples of two-component curing type thermosetting resins include epoxy resins, urethane resins, acrylic resins, polyester resins, and cellulose resins. In light of strength and durability of the reinforcing layer 22, two-component curing type epoxy resins and two-component curing type urethane resins are preferred.

A two-component curing type epoxy resin is obtained by curing an epoxy resin with a polyamide type curing agent. Examples of epoxy resins used in two-component curing type epoxy resins include bisphenol A type epoxy resins, bisphenol F type epoxy resins, and bisphenol AD type epoxy resins. In light of balance among flexibility, chemical resistance, heat resistance, and toughness, bisphenol A type epoxy resins are preferred. Specific examples of the polyamide type curing agent include polyamide amine curing agents and modified products thereof. In a mixture of an epoxy resin and a polyamide type curing agent, the ratio of the epoxy equivalent of the epoxy resin to the amine active hydrogen equivalent of the polyamide type curing agent is preferably equal to or greater than 1.0/1.4 but equal to or less than 1.0/1.0.

A two-component curing type urethane resin is obtained by a reaction of a base material and a curing agent. A two-component curing type urethane resin obtained by a reaction of a base material containing a polyol component and a curing agent containing a polyisocyanate or a derivative thereof, and a two-component curing type urethane resin obtained by a reaction of a base material containing an isocyanate group-terminated urethane prepolymer and a curing agent having active hydrogen, can be used. Particularly, a two-component curing type urethane resin obtained by a reaction of a base material containing a polyol component and a curing agent containing a polyisocyanate or a derivative thereof, is preferred.

The reinforcing layer 22 may include additives such as a coloring agent (typically, titanium dioxide), a phosphate-based stabilizer, an antioxidant, a light stabilizer, a fluorescent brightener, an ultraviolet absorber, an anti-blocking agent, and the like. The additives may be added to the base material of the two-component curing type thermosetting resin, or may be added to the curing agent of the two-component curing type thermosetting resin.

The reinforcing layer 22 is obtained by applying, to the surface of the inner layer cover 14, a liquid that is prepared by dissolving or dispersing the base material and the curing agent in a solvent. In light of workability, application with a spray gun is preferred. After the application, the solvent is volatilized to permit a reaction of the base material with the curing agent, thereby forming the reinforcing layer 22. Examples of preferable solvents include toluene, isopropyl alcohol, xylene, methyl ethyl ketone, methyl isobutyl ketone, ethylene glycol monomethyl ether, ethylbenzene, propylene glycol monomethyl ether, isobutyl alcohol, and ethyl acetate.

In light of suppression of a wrinkle, the reinforcing layer 22 has a thickness of preferably 3 μm or greater and more preferably 5 μm or greater. In light of ease of forming the reinforcing layer 22, the thickness is preferably equal to or less than 100 μm, more preferably equal to or less than 50 μm, and further preferably equal to or less than 20 μm. The thickness is measured by observing a cross section of the golf ball 2 with a microscope. When the inner layer cover 14 has concavities and convexities on its surface from surface roughening, the thickness is measured at a convex part.

In light of suppression of a wrinkle, the reinforcing layer 22 has a pencil hardness of preferably 4B or greater and more preferably B or greater. In light of reduced loss of the power transmission from the outer layer cover 16 to the inner layer cover 14 upon hitting the golf ball 2, the pencil hardness of the reinforcing layer 22 is preferably equal to or less than 3H. The pencil hardness is measured according to the standards of "JIS K5400".

The reinforcing layer 22 may not be provided. For example, when the inner layer cover 14 and the outer layer cover 16 sufficiently adhere to each other so that a wrinkle is unlikely to occur, the reinforcing layer 22 may not be provided.

In light of feel at impact, the golf ball 2 has an amount of compressive deformation of preferably 2.0 mm or greater and more preferably 2.2 mm or greater. In light of resilience performance, the amount of compressive deformation of the golf ball 2 is preferably equal to or less than 3.6 mm and more preferably equal to or less than 3.2 mm.

In measurement of the amount of compressive deformation, a sphere (the golf ball 2) is placed on a hard plate made of metal. Next, a cylinder made of metal gradually descends toward the sphere. The sphere, squeezed between the bottom face of the cylinder and the hard plate, becomes deformed. A migration distance of the cylinder, starting from the state in which an initial load of 98 N is applied to the sphere up to the state in which a final load of 1274 N is applied thereto, is measured.

The golf ball 2 meets the following relational expressions (a) to (h):

$$Vc/V<0.07, \qquad (a)$$

$$Hm>Hinc>Houc, \qquad (b)$$

$$Hm-Houc>25, \qquad (c)$$

$$Vm>Vinc>Vouc, \qquad (d)$$

$$(Vm+Vinc+Vouc)/V<0.30, \qquad (e)$$

$$Vm/Vouc>1.50, \qquad (f)$$

$$(Vm*Hm)/(Vouc*Houc)>3.0, \qquad (g)$$

and $$Vouc/V<0.08. \qquad (h)$$

[(a) Vc/V<0.07]

The ratio (Vc/V) of the volume Vc of the inner core 10 relative to the volume V of the ball 2 is preferably less than 0.07. When Vc/V is made less than 0.07, the resilience performance is enhanced, and the durability can improve. In this respect, Vc/V is preferably equal to or less than 0.05. In light of reducing a spin rate upon a shot with a driver, Vc/V is preferably equal to or greater than 0.02 and more preferably equal to or greater than 0.03.

It should be noted that the volume V of the ball 2 includes the volumes of the dimples 18. In calculation of the volume V, the outer surface of the ball 2 is regarded as a spherical surface including the surface of the land 20.

[(b) Hm>Hinc>Houc]

The Shore D hardness Hm of the mid layer 6 is preferably greater than the Shore D hardness Hinc of the inner layer cover 14. The hardness Hinc is preferably greater than the Shore D hardness Houc of the outer layer cover 16. When the hardness Houc is high, approach performance can decrease. When the hardness Houc is made the lowest among the three hardnesses Hm, Hinc, and Houc, the approach performance is enhanced.

When the hardness Hinc is the highest among the three hardnesses Hm, Hinc, and Houc, feel at impact becomes hard. When the outer layer cover 16 is made thick in order to avoid this hard feel at impact, flight distance performance upon a shot with a driver decreases. When these hardnesses are made lower in order of Hm, Hinc, and Houc, both desired flight distance performance and desired feel at impact can be achieved.

In the golf ball 2, the descending order of the hardness is the mid layer 6, the inner layer cover 14, and the outer layer cover 16. That is, in the golf ball 2, the hardness does not sharply change from the outer side of the core 4 toward the ball surface. When the golf ball 2 is hit, no local load is applied thereto. The golf ball 2 has excellent durability.

[(c) Hm−Houc>25]

The difference (Hm−Houc) between the hardness Hm of the mid layer 6 and the hardness Houc of the outer layer cover 16 is preferably greater than 25. In the golf ball 2 that meets this condition, a spin rate can be sufficiently suppressed upon a shot with a driver. When the golf ball 2 is hit with a driver, the flight distance is large. In this respect, the difference (Hm−Houc) is more preferably equal to or greater than 27 and more preferably equal to or greater than 29. In light of durability, the difference (Hm−Houc) is preferably equal to or less than 55 and more preferably equal to or less than 50.

[Hinc−Houc]

In light of resilience performance, the difference (Hinc−Houc) between the hardness Hinc of the inner layer cover 14 and the hardness Houc of the outer layer cover 16 is preferably equal to or greater than 14, more preferably equal to or greater than 17, and more preferably equal to or greater than 20. In light of feel at impact, the difference (Hinc−Houc) is preferably equal to or less than 38, more preferably equal to or less than 34, and more preferably equal to or less than 28.

[(d) Vm>Vinc>Vouc]

The volume Vm of the mid layer 6 is preferably greater than the volume Vinc of the inner layer cover 14. The volume Vinc is preferably greater than the volume Vouc of the outer layer cover 16. In the golf ball 2, the mid layer 6, the inner layer cover 14, and the outer layer cover 16 are arranged in appropriate balance from the outer side of the core 4 to the ball surface. In the golf ball 2 which is a sphere, variation of the volume of each layer greatly influences various performance characteristics. In the golf ball 2 according to the present invention, the mid layer 6, the inner layer cover 14, and the outer layer cover 16 are arranged on the basis of the volume of each layer. In the golf ball 2, both high flight distance performance and approach performance can be achieved on a high level without impairing feel at impact and durability.

The volume order in this (d) corresponds to the hardness order in the aforementioned (b). This volume order and this hardness order can exert a synergistic effect. The synergistic effect contributes to achievement of both high flight distance performance and desired approach performance.

In the golf ball 2, the descending order of volume is the mid layer 6, the inner layer cover 14, and the outer layer cover 16. As described above, in the golf ball 2, the hardness is lower in order of the mid layer 6, the inner layer cover 14, and the outer layer cover 16. In the golf ball 2, the volume of the most flexible outer layer cover 16 is the smallest. In the golf ball 2, the flexible outer layer cover 16 suppresses excessive spin.

[(e) (Vm+Vinc+Vouc)/V<0.30]

Preferably, the ratio [(Vm+Vinc+Vouc)/V] of the sum (Vm+Vinc+Vouc) of the volume Vm, the volume Vinc, and the volume Vouc relative to the volume V of the entire golf ball 2 is less than 0.30. In the golf ball 2, when a sufficiently large core 4 is formed, excellent resilience performance of the core 4 can be exerted. In this respect, the ratio [(Vm+Vinc+Vouc)/V] is more preferably equal to or less than 0.29 and more preferably equal to or less than 0.28. In light of balance between the core 4 and the mid layer 6, the inner layer cover 14, and the outer layer cover 16, the ratio [(Vm+Vinc+Vouc)/V] is preferably equal to or greater than 0.19 and more preferably equal to or greater than 0.20.

[(f) Vm/Vouc>1.50]

The ratio (Vm/Vouc) of the volume Vm of the mid layer 6 relative to the volume Vouc of the outer layer cover 16 is preferably greater than 1.50. In the golf ball 2, the most flexible outer layer cover 16 and the mid layer 6 harder than the outer layer cover 16 are arranged in a well-balanced manner. In the golf ball 2, although the outer layer cover 16 is flexible, a spin rate can be sufficiently suppressed upon a shot with a driver. In this respect, the ratio (Vm/Vouc) is more preferably equal to or greater than 1.70 and particularly preferably equal to or greater than 2.50. In light of balance between the outer layer cover 16 and the mid layer 6, the ratio (Vm/Vouc) is preferably equal to or less than 4.2 and more preferably equal to or less than 4.0.

[Vinc/Vouc]

The ratio (Vinc/Vouc) of the volume Vinc of the inner layer cover 14 relative to the volume Vouc of the outer layer cover 16 is preferably equal to or greater than 1.20 and more preferably equal to or greater than 1.30. In the golf ball 2, the most flexible outer layer cover 16 and the inner layer cover 14 harder than the outer layer cover 16 are arranged in a well-balanced manner. Although the outer layer cover 16 is flexible, the golf ball 2 has excellent resilience performance. In light of approach performance, the ratio (Vinc/Vouc) is preferably equal to or less than 3.3.

[(g) (Vm*Hm)/(Vouc*Houc)>3.0]

Regarding the mid layer 6, the product (Vm* Hm) of the volume Vm and the hardness Hm is an overall index that reflects the volume and the hardness. Regarding the mid layer 6, the product (Vouc*Houc) of the volume Vouc and the hardness Houc is an overall index that reflects the volume and the hardness.

Preferably, the product (Vm*Hm) and the product (Vouc*Houc) meet the following relationship:

$$[(Vm*Hm)/(Vouc*Houc)]>3.0. \quad (g)$$

In the golf ball 2 that meets this relationship, the balance between the mid layer 6 and the outer layer cover 16 is appropriate. In the golf ball 2, although the outer layer cover 16 is flexible, a spin rate can be sufficiently suppressed upon a shot with a driver. In this respect, the ratio [(Vm*Hm)/(Vouc*Houc)] is more preferably equal to or greater than 4.0 and more preferably equal to or greater than 6.0. In light of balance between the mid layer 6 and the outer layer cover 16, the ratio [(Vm*Hm)/(Vouc* Houc)] is preferably equal to or less than 10.0 and more preferably equal to or less than 9.0.

[(h) Vouc/V<0.08]

Preferably, the ratio (Vouc/V) of the volume Vouc relative to the volume V is less than 0.08. In the golf ball 2, suppression of spin upon a shot with a driver is not impaired due to the presence of the flexible outer layer cover 16. In this respect, the ratio (Vouc/V) is particularly preferably equal to or less than 0.04. In light of durability, the ratio (Vouc/V) is preferably equal to or greater than 0.01.

The hardness Houc of the outer layer cover 16 of the golf ball 2 is less than the hardness Hinc of the inner layer cover 14. When the golf ball 2 is hit with a driver, a sphere consisting of the core 4, the mid layer 6, and the inner layer cover 14 becomes significantly distorted since the head speed is high. In the core 4, the outer-hard/inner-soft structure is formed. The core 4 suppresses a spin rate. The golf ball 2 is launched at a high speed due to deformation and restoration of the core 4. The suppression of the spin rate and the high launch speed achieve a large flight distance. When the golf ball 2 is hit with a short iron, the sphere consisting of the core 4, the mid layer 6, and the inner layer cover 14 becomes less distorted since the head speed is low. When the golf ball 2 is hit with a short iron, the behavior of the golf ball 2 mainly depends on the outer layer cover 16. In the golf ball 2, since the outer layer cover 16 is flexible, a slip between the golf ball 2 and a clubface is suppressed. Due to the suppression of the slip, a high spin rate is obtained. The high spin rate achieves excellent approach performance.

EXAMPLES

The following will show the effects of the present invention by means of Examples, but the present invention should not be construed in a limited manner based on the description of these Examples.

Example 1

Type 1 in Table 1 was used as the composition of an inner core. A rubber composition was obtained by kneading 100 parts by weight of a high-cis polybutadiene (trade name "BR-730", manufactured by JSR Corporation), 23 parts by weight of zinc diacrylate (trade name "Sanceler SR", manufactured by SANSHIN CHEMICAL INDUSTRY CO., LTD.), 5 parts by weight of zinc oxide, an appropriate amount of barium sulfate, 0.2 parts by weight of 2-thionaphthol (manufactured by Tokyo Chemical Industry Co., Ltd.), 0.9 parts by weight of dicumyl peroxide (trade name "Percumyl D", manufactured by NOF Corporation), and 2 parts by weight of zinc octoate (manufactured by Mitsuwa Chemicals Co., Ltd.). This rubber composition was placed into a mold including upper and lower mold halves each having a hemispherical cavity, and heated at 150° C. for 20 minutes to obtain a spherical inner core with a diameter of 15 mm.

Type 3 in Table 1 was used as the composition of an outer core. A rubber composition was obtained by kneading 100 parts by weight of a high-cis polybutadiene (the aforementioned "BR-730"), 33 parts by weight of zinc diacrylate (the aforementioned "Sanceler SR"), 5 parts by weight of zinc oxide, an appropriate amount of barium sulfate (manufactured by Sakai Chemical Industry Co., Ltd), 0.2 parts by weight of 2-thionaphthol (manufactured by Tokyo Chemical Industry Co., Ltd.), 0.9 parts by weight of dicumyl peroxide (the aforementioned "Percumyl D"), and 2 parts by weight of zinc octoate (manufactured by Mitsuwa Chemicals Co., Ltd.). Half shells were formed from this rubber composition. A sphere that is the above inner core was covered with two of these half shells. The inner core covered with the half shells was placed into a mold including upper and lower mold halves each having a hemispherical cavity, and heated at 150° C. for 20 minutes to obtain a core with a diameter of 38.5 mm. The half shells were molded as an outer core. The amounts of barium sulfate in the inner core and the outer core were adjusted such that the weight of a ball is 45.6 g.

Type a in Table 2 was used as the composition of a mid layer. A resin composition was obtained by kneading 50 parts by weight of an ionomer resin (the aforementioned "Surlyn 8150"), 50 parts by weight of another ionomer resin (the aforementioned "Himilan 9150"), and 3 parts by weight of titanium dioxide with a twin-screw kneading extruder. The extruding conditions were a screw diameter of 45 mm, a screw rotational speed of 200 rpm, screw L/D of 35, and a die temperature of 160° C. to 230° C. The core was placed into a mold. The resin composition was injected around the core by injection molding to form a mid layer. The thickness of the mid layer was 1.0 mm.

Type d in Table 2 was used as the composition of an inner layer cover. A resin composition was obtained by kneading 31.5 parts by weight of an ionomer resin (the aforementioned "Himilan AM7337"), 38.5 parts by weight of another ionomer resin (the aforementioned "Himilan AM7329"), 16 parts by weight of an ethylene-methacrylic acid copolymer (trade name "NUCREL N1050H", manufactured by Du Pont-MITSUI POLYCHEMICALS Co., Ltd.), 14 parts by weight of a styrene block-containing thermoplastic elastomer (the aforementioned "Rabalon T3221C"), and 3 parts by weight of titanium dioxide with a twin-screw kneading extruder under the above extruding conditions. The sphere consisting of the core and the mid layer was placed into a mold. The resin composition was injected around the sphere by injection molding to form an inner layer cover. The thickness of the inner layer cover was 0.8 mm.

A paint composition (trade name "POLIN 750LE", manufactured by SHINTO PAINT CO., LTD.) including a two-component curing type epoxy resin as a base polymer was prepared. The base material liquid of this paint composition includes 30 parts by weight of a bisphenol A type solid epoxy resin and 70 parts by weight of a solvent. The curing agent liquid of this paint composition includes 40 parts by weight of a modified polyamide amine, 55 parts by weight of a solvent, and 5 parts by weight of titanium dioxide. The weight ratio of the base material liquid to the curing agent liquid is 1/1. This paint composition was applied to the surface of the inner layer cover with an air gun, and kept at 23° C. for 12 hours to obtain a reinforcing layer. The thickness of the reinforcing layer was 7 µm.

Type A in Table 3 was used as the composition of an outer layer cover. A resin composition was obtained by kneading 100 parts by weight of a thermoplastic polyurethane elastomer (the aforementioned "Elastollan NY83A"), 0.2 parts by weight of a hindered amine light stabilizer (trade name "TINUVIN 770", manufactured by Ciba Japan K.K.), 4 parts by weight of titanium dioxide, and 0.04 parts by weight of ultramarine blue with a twin-screw kneading extruder under the above extruding conditions. Half shells were formed from this resin composition by compression molding. The sphere consisting of the core, the mid layer, the inner layer cover, and the reinforcing layer was covered with two of these half shells. The sphere and the half shells were placed into a final mold that includes upper and lower mold halves each having a hemispherical cavity and that has a large number of pimples on its cavity face. An outer layer was obtained by compression molding. The thickness of the cover was 0.3 mm. Dimples having a shape that is the inverted shape of the pimples were formed on the cover. The surface of the cover was polished. A clear paint including a two-component curing type polyurethane as a base material was applied to this cover with an air gun, and was dried and cured to obtain a golf ball of Example 1 with a diameter of 42.7 mm and a weight of 45.6 g.

Examples 2 to 9 and Comparative Examples 1 to 7

Golf balls of Examples 2 to 9 and Comparative Examples 1 to 7 were obtained in the same manner as Example 1, except the specifications of the inner core, the outer core, the mid layer, the inner layer cover, and the outer layer cover were as shown in Tables 4 to 6 below. The rubber compositions of the inner core and the outer core are shown in detail in Table 1 below. The resin compositions of the mid layer and the inner layer cover are shown in detail in Table 2 below. The resin composition of the outer layer cover is shown in detail in Table 3 below. The cover of the golf ball according to Comparative Example 6 is composed of a single layer. The core of the golf ball according to Comparative Example 7 is composed of a single layer. The outer core of Example 6 does not include any fatty acid that can react with the co-crosslinking agent.

[Resilience Coefficient]

A metallic cylinder having a weight of 198.4 g was caused to collide against a golf ball at a speed of 45 m/sec. The speeds of the metallic cylinder and the golf ball before and after the collision were measured, and a resilience coefficient was calculated based on the speeds. An average value obtained for 12 golf balls is shown as an index in Tables 7 to 9 below. The higher the index is, the more excellent the resilience performance of the golf ball is.

[Shot with Driver (W#1)]

A driver with a titanium head (trade name "XXIO", manufactured by DUNLOP SPORTS CO. LTD., shaft hardness: S, loft angle: 10.0°) was attached to a swing machine manufactured by Golf Laboratories, Inc. A golf ball was hit under the condition of a head speed of 45 m/sec. The backspin rate immediately after the hit and the flight distance from the launch point to the stop point were measured. The average value of data obtained by 10 measurements is shown in Tables 7 to 9 below.

[Hit with Sand Wedge (SW)]

A sand wedge (trade name "XXIO", manufactured by DUNLOP SPORTS CO. LTD., shaft hardness: R, loft angle: 56.0°) was attached to a swing machine manufactured by True Temper Co. A golf ball was hit under the condition of a head speed of 21 m/sec. The backspin rate was measured immediately after the hit. The average value of data obtained by 10 measurements is shown in Tables 7 to 9 below.

[Durability]

A driver with a titanium head (trade name "XXIO", manufactured by DUNLOP SPORTS CO. LTD., shaft hardness: S, loft angle: 10.0°) was attached to a swing robot M/C manufactured by True Temper Co. A golf ball having been kept at 23° C. for 12 hours was used for the measurement. The golf ball was repeatedly hit under the condition of a head speed of 45 m/sec. The number of hits required to break the golf ball was measured. An average value obtained for 12 golf balls is shown as an index in Tables 7 to 9 below. The higher the index is, the more excellent the durability of the golf ball is.

[Feel at Impact]

A golf player hit golf balls with a driver (trade name "XXIO", manufactured by DUNLOP SPORTS CO. LTD., shaft hardness: S, loft angle: 10.0°) and categorized the evaluation on the basis of the following criteria. The results are shown in Tables 7 to 9 below.

A: very favorable (soft)
B: favorable (slightly soft)
C: slightly poor (slightly hard)
D: poor (hard)

TABLE 1

Compositions of Inner Core and Outer Core

| Type | 1 | 2 | 3 | 4 | 5 | 6 | 7 |
|---|---|---|---|---|---|---|---|
| BR-730 | 100 | 100 | 100 | 100 | 100 | 100 | 100 |
| Sanceler SR | 23 | 27 | 33 | 32 | 34 | 35 | 31 |
| Zinc oxide | 5 | 5 | 5 | 5 | 5 | 5 | 5 |
| Barium sulfate | Appropriate amount | Appropriate amount | Appropriate amount | Appropriate amount | Appropriate amount | Appropriate amount | Appropriate amount |
| 2-thionaphthol | 0.2 | 0.2 | 0.2 | 0.2 | 0.2 | 0.2 | 0.2 |
| Dicumyl peroxide | 0.9 | 0.9 | 0.9 | 0.9 | 0.9 | 0.9 | 0.9 |
| Zinc octoate | 2 | 2 | 2 | 2 | 2 | 2 | 0 |

The details of the compounds listed in Table 1 are as follows.

BR-730: a high-cis polybutadiene manufactured by JSR Corporation (cis-1,4-bond content: 96% by weight, 1,2-vinyl bond content: 1.3% by weight, Mooney viscosity ($ML_{1+4}$ (100° C.)): 55, molecular weight distribution (Mw/Mn): 3)

Sanceler SR: zinc diacrylate manufactured by SANSHIN CHEMICAL INDUSTRY CO., LTD. (a product coated with 10% by weight of stearic acid)

Zinc oxide: trade name "Ginrei R", manufactured by Toho Zinc Co., Ltd.

Barium sulfate: trade name "Barium Sulfate BD", manufactured by Sakai Chemical Industry Co., Ltd.

2-thionaphthol: a product of Tokyo Chemical Industry Co., Ltd.

Dicumyl peroxide: trade name "Percumyl D", manufactured by NOF Corporation

Zinc octoate: a product of Mitsuwa Chemicals Co., Ltd.

TABLE 2

Compositions and Hardnesses of Mid Layer and Inner Layer Cover

| Type | a | b | c | d |
|---|---|---|---|---|
| Surlyn 8150 | 50 | 32.5 | — | — |
| Surlyn 9150 | 50 | 32.5 | — | — |
| Nylon 6 | — | 35 | — | — |
| Himilan AM7337 | — | — | 55 | 31.5 |
| Himilan AM7329 | — | — | 45 | 38.5 |
| NUCREL N1050H | — | — | — | 16 |

TABLE 2-continued

Compositions and Hardnesses of Mid Layer and Inner Layer Cover

| Type | a | b | c | d |
|---|---|---|---|---|
| Rabalon T3221C | — | — | — | 14 |
| Titanium dioxide | 3 | 3 | 3 | 3 |
| Hardness (Shore D) | 70 | 72 | 65 | 55 |

The details of the compounds listed in Table 2 are as follows.

Nylon 6: a polyamide resin manufactured by Toray Industries Inc.

Titanium dioxide: a product of Ishihara Sangyo Kaisha, Ltd.

TABLE 3

Composition and Hardness of Outer Layer Cover

| Type | A | B | C |
|---|---|---|---|
| Elastollan NY83A | 100 | — | — |
| Elastollan NY85A | — | 50 | — |
| Elastollan NY90A | — | 50 | — |
| Elastollan NY97A | — | — | 100 |
| TINUVIN 770 | 0.2 | 0.2 | 0.2 |
| Titanium dioxide | 4 | 4 | 4 |
| Ultramarine blue | 0.04 | 0.04 | 0.04 |
| Hardness (Shore D) | 30 | 36 | 47 |

TABLE 4

Configuration of Golf Ball

| | | Ex. 1 | Ex. 2 | Comp. Ex. 1 | Ex. 3 | Comp. Ex. 2 | Comp. Ex. 3 |
|---|---|---|---|---|---|---|---|
| Inner core | Composition | 1 | 2 | 1 | 1 | 1 | 1 |
| | Vulc. Temp. (° C.) | 150 | 150 | 150 | 150 | 150 | 150 |
| | Vulc. time (min) | 20 | 20 | 20 | 20 | 20 | 20 |
| | Diameter I (mm) | 15 | 15 | 19 | 15 | 15 | 15 |
| | Volume Vc (mm$^3$) | 1766 | 1766 | 3590 | 1766 | 1766 | 1766 |
| Outer core | Composition | 3 | 3 | 3 | 3 | 3 | 4 |
| | Vulc. Temp. (° C.) | 150 | 150 | 150 | 150 | 150 | 150 |
| | Vulc. time (min) | 20 | 20 | 20 | 20 | 20 | 20 |
| | Diameter II (mm) | 38.5 | 38.5 | 38.5 | 38.1 | 38.5 | 37.3 |
| Hardness distribution of core | Central hardness Ho (JIS-C) | 55 | 64 | 55 | 55 | 55 | 55 |
| | Surface hardness Hs (JIS-C) | 87 | 87 | 87 | 87 | 87 | 86 |
| | Difference (Hs − Ho) | 32 | 23 | 32 | 32 | 32 | 31 |
| Mid layer | Composition | a | a | a | a | d | a |
| | Hardness Hm (Shore D) | 70 | 70 | 70 | 70 | 55 | 70 |
| | Diameter III (mm) | 40.5 | 40.5 | 40.5 | 40.1 | 40.5 | 39.3 |
| | Thickness Tm (mm) | 1 | 1 | 1 | 1 | 1 | 1 |
| | Volume Vm (mm$^3$) | 4900 | 4900 | 4900 | 4802 | 4900 | 4607 |
| Inner layer cover | Composition | d | d | d | d | a | d |
| | Hardness Hinc (Shore D) | 55 | 55 | 55 | 55 | 70 | 55 |
| | Diameter IV (mm) | 42.1 | 42.1 | 42.1 | 41.7 | 42.1 | 40.9 |
| | Thickness Tinc (mm) | 0.8 | 0.8 | 0.8 | 0.8 | 0.8 | 0.8 |
| | Volume Vinc (mm$^3$) | 4285 | 4285 | 4285 | 4203 | 4285 | 4040 |
| Outer layer cover | Composition | A | A | A | A | A | A |
| | Hardness Houc (Shore D) | 30 | 30 | 30 | 30 | 30 | 30 |
| | Thickness Touc (mm) | 0.3 | 0.3 | 0.3 | 0.5 | 0.3 | 0.9 |
| | Volume Vouc (mm$^3$) | 1694 | 1694 | 1694 | 2796 | 1694 | 4938 |

TABLE 5

Configuration of Golf Ball

| | | Ex. 4 | Comp. Ex. 4 | Ex. 5 | Ex. 6 | Ex. 7 |
|---|---|---|---|---|---|---|
| Inner core | Composition | 1 | 1 | 1 | 1 | 1 |
| | Vulc. Temp. (° C.) | 150 | 150 | 150 | 150 | 150 |
| | Vulc. time (min) | 20 | 20 | 20 | 20 | 20 |
| | Diameter I (mm) | 15 | 15 | 15 | 15 | 15 |
| | volume Vc (mm$^3$) | 1766 | 1766 | 1766 | 1766 | 1766 |

TABLE 5-continued

| | Configuration of Golf Ball | Ex. 4 | Comp. Ex. 4 | Ex. 5 | Ex. 6 | Ex. 7 |
|---|---|---|---|---|---|---|
| Outer core | Composition | 3 | 3 | 4 | 7 | 5 |
| | Vulc. Temp. (° C.) | 150 | 150 | 150 | 150 | 150 |
| | Vulc. time (min) | 20 | 20 | 20 | 20 | 20 |
| | Diameter II (mm) | 38.5 | 38.5 | 38.5 | 38.5 | 38.5 |
| Hardness distribution of core | Central hardness Ho (JIS-C) | 55 | 55 | 55 | 55 | 55 |
| | Surface hardness Hs (JIS-C) | 87 | 87 | 86 | 84 | 88 |
| | Difference (Hs − Ho) | 32 | 32 | 31 | 29 | 33 |
| Mid layer | Composition | a | a | b | a | c |
| | Hardness Hm (Shore D) | 70 | 70 | 72 | 70 | 65 |
| | Diameter III (mm) | 40.5 | 40.5 | 40.5 | 40.5 | 40.5 |
| | Thickness Tm (mm) | 1 | 1 | 1 | 1 | 1 |
| | Volume Vm (mm³) | 4900 | 4900 | 4900 | 4900 | 4900 |
| Inner layer cover | Composition | d | d | d | d | d |
| | Hardness Hinc (Shore D) | 55 | 55 | 55 | 55 | 55 |
| | Diameter IV (mm) | 42.1 | 42.1 | 42.1 | 42.1 | 42.1 |
| | Thickness Tinc (mm) | 0.8 | 0.8 | 0.8 | 0.8 | 0.8 |
| | Volume Vinc (mm³) | 4285 | 4285 | 4285 | 4285 | 4285 |
| Outer layer cover | Composition | B | C | A | A | A |
| | Hardness Houc (Shore D) | 36 | 47 | 30 | 30 | 30 |
| | Thickness Touc (mm) | 0.3 | 0.3 | 0.3 | 0.3 | 0.3 |
| | Volume Vouc (mm³) | 1694 | 1694 | 1694 | 1694 | 1694 |

TABLE 6

| | Configuration of Golf Ball | Ex. 8 | Ex. 9 | Comp. Ex. 5 | Comp. Ex. 6 | Comp. Ex. 7 |
|---|---|---|---|---|---|---|
| Inner core | Composition | 1 | 1 | 1 | 1 | 3 |
| | Vulc. Temp. (° C.) | 150 | 150 | 150 | 150 | 150 |
| | Vulc. time (min) | 20 | 20 | 20 | 20 | 20 |
| | Diameter I (mm) | 15 | 15 | 15 | 15 | 38.5 |
| | Volume Vc (mm³) | 1766 | 1766 | 1766 | 1766 | 29865 |
| Outer core | Composition | 3 | 3 | 3 | 6 | — |
| | Vulc. Temp. (° C.) | 150 | 150 | 150 | 150 | — |
| | Vulc. time (min) | 20 | 20 | 20 | 20 | — |
| | Diameter II (mm) | 38.5 | 38.5 | 37.5 | 40.1 | — |
| Hardness distribution of core | Central hardness Ho (JIS-C) | 55 | 55 | 55 | 55 | 61 |
| | Surface hardness Hs (JIS-C) | 87 | 87 | 86 | 89 | 87 |
| | Difference (Hs − Ho) | 32 | 32 | 31 | 34 | 26 |
| Mid layer | Composition | a | a | a | a | a |
| | Hardness Hm (Shore D) | 70 | 70 | 70 | 70 | 70 |
| | Diameter III (mm) | 40.5 | 40.5 | 39.5 | 42.1 | 40.5 |
| | Thickness Tm (mm) | 1.0 | 1.0 | 1.0 | 1.0 | 1.0 |
| | Volume Vm (mm³) | 4900 | 4900 | 4655 | 5305 | 4900 |
| Inner layer cover | Composition | c | c | d | — | d |
| | Hardness Hinc (Shore D) | 65 | 65 | 55 | — | 55 |
| | Diameter IV (mm) | 42.1 | 42.1 | 41.5 | — | 42.1 |
| | Thickness Tinc (mm) | 0.8 | 0.8 | 1.0 | — | 0.8 |
| | Volume Vinc (mm³) | 4285 | 4285 | 5151 | — | 4285 |
| Outer layer cover | Composition | A | B | A | A | A |
| | Hardness Houc (Shore D) | 30 | 36 | 30 | 30 | 30 |
| | Thickness Touc (mm) | 0.3 | 0.3 | 0.6 | 0.3 | 0.3 |
| | Volume Vouc (mm³) | 1694 | 1694 | 3339 | 1694 | 1694 |

In Tables 4 to 6, the diameter I is the diameter (mm) of the inner core, the diameter II is the diameter (mm) of the core consisting of the inner core and the outer core, the diameter III is the diameter (mm) of the sphere consisting of the core and the mid layer, and the diameter IV is the diameter (mm) of the sphere consisting of the core, the mid layer, and the inner cover.

TABLE 7

Results of Evaluation

| | | Ex. 1 | Ex. 2 | Comp. Ex. 1 | Ex. 3 | Comp. Ex. 2 | Comp. Ex. 3 |
|---|---|---|---|---|---|---|---|
| (a) | Vc/V | 0.04 | 0.04 | 0.09 | 0.04 | 0.04 | 0.04 |
| (c) | Hm-Houc | 40 | 40 | 40 | 40 | 25 | 40 |
| (e) | (Vm + Vinc + Vouc)/V | 0.27 | 0.27 | 0.27 | 0.29 | 0.27 | 0.33 |
| (f) | Vm/Vouc | 2.9 | 2.9 | 2.9 | 1.7 | 2.9 | 0.9 |
| (g) | (Vm*Hm)/(Vouc*Houc) | 6.8 | 6.8 | 6.8 | 4.0 | 5.3 | 2.2 |
| (h) | Vouc/V | 0.04 | 0.04 | 0.04 | 0.07 | 0.04 | 0.12 |
| Ball characteristics | Amount of compressive deformation (mm) | 2.2 | 2.1 | 2.3 | 2.2 | 2.2 | 2.2 |
| | Resilience coefficient | 100 | 102 | 93 | 99 | 99 | 93 |
| | W#1: Spin rate (rpm) | 2800 | 2950 | 2750 | 2950 | 2750 | 3100 |
| | W#1: Flight distance (m) | 251 | 247 | 245 | 247 | 253 | 242 |
| | SW: Spin rate (rpm) | 6650 | 6650 | 6600 | 6800 | 6300 | 6800 |
| | Durability | 100 | 105 | 80 | 105 | 60 | 106 |
| | Feel at impact | A | B | A | A | D | A |

TABLE 8

Results of Evaluation

| | | Ex. 4 | Comp. Ex. 4 | Ex. 5 | Ex. 6 | Ex. 7 |
|---|---|---|---|---|---|---|
| (a) | Vc/V | 0.04 | 0.04 | 0.04 | 0.04 | 0.04 |
| (c) | Hm-Houc | 34 | 23 | 42 | 40 | 35 |
| (e) | (Vm + Vinc + Vouc)/V | 0.27 | 0.27 | 0.27 | 0.27 | 0.27 |
| (f) | Vm/Vouc | 2.9 | 2.9 | 2.9 | 2.9 | 2.9 |
| (g) | (Vm*Hm)/(Vouc*Houc) | 5.6 | 4.3 | 6.9 | 6.8 | 6.3 |
| (h) | Vouc/V | 0.04 | 0.04 | 0.04 | 0.04 | 0.04 |
| Ball characteristics | Amount of compressive deformation (mm) | 2.2 | 2.2 | 2.2 | 2.2 | 2.2 |
| | Resilience coefficient | 98 | 97 | 100 | 100 | 98 |
| | W#1: Spin rate (rpm) | 2700 | 2600 | 2700 | 2900 | 2850 |
| | W#1: Flight distance (m) | 252 | 253 | 253 | 249 | 248 |
| | SW: Spin rate (rpm) | 6500 | 6250 | 6600 | 6650 | 6650 |
| | Durability | 94 | 82 | 98 | 103 | 112 |
| | Feel at impact | B | D | B | B | A |

TABLE 9

Results of Evaluation

| | | Ex. 8 | Ex. 9 | Comp. Ex. 5 | Comp. Ex. 6 | Comp. Ex. 7 |
|---|---|---|---|---|---|---|
| (a) | Vc/V | 0.04 | 0.04 | 0.04 | 0.04 | 0.73 |
| (c) | Hm-Houc | 40 | 34 | 40 | — | 40 |
| (e) | (Vm + Vinc + Vouc)/V | 0.27 | 0.27 | 0.32 | — | 0.27 |
| (f) | Vm/Vouc | 2.9 | 2.9 | 1.4 | — | 2.9 |
| (g) | (Vm*Hm)/(Vouc*Houc) | 6.8 | 5.6 | 3.3 | — | 6.8 |
| (h) | Vouc/V | 0.04 | 0.04 | 0.08 | 0.04 | 0.04 |
| Ball characteristics | Amount of compressive deformation (mm) | 2.1 | 2.1 | 2.2 | 2.2 | 2.1 |
| | Resilience coefficient | 101 | 99 | 94 | 102 | 101 |
| | W#1: Spin rate (rpm) | 2700 | 2650 | 3000 | 2700 | 3000 |
| | W#1: Flight distance (m) | 253 | 253 | 244 | 255 | 245 |
| | SW: Spin rate (rpm) | 6550 | 6500 | 6750 | 6300 | 6650 |
| | Durability | 97 | 95 | 104 | 48 | 105 |
| | Feel at impact | A | B | A | D | B |

As shown in Tables 7 to 9, the golf ball of each Example is excellent in high flight distance performance, approach performance, feel at impact, and durability. From the results of evaluation, advantages of the present invention are clear.

INDUSTRIAL APPLICABILITY

The golf ball according to the present invention can be used for playing golf on golf courses and practicing at driving ranges.

DESCRIPTION OF THE REFERENCE CHARACTERS

2 . . . golf ball
4 . . . core
6 . . . mid layer
8 . . . cover
10 . . . inner core
12 . . . outer core 14 . . . inner layer cover
16 . . . outer layer cover
18 . . . dimple
20 . . . land
22 . . . reinforcing layer

The invention claimed is:

1. A golf ball comprising a core, a mid layer positioned outside the core, and a cover positioned outside the mid layer, wherein
the golf ball diameter is equal to or greater than 40 mm but equal to or less than 45 mm,
the core includes an inner core and an outer core positioned outside the inner core,
the core diameter is equal to or greater than 37.0 mm but equal to or less than 42.0 mm,
the outer core volume Vr is equal to or greater than 25,500 mm$^3$ but equal to or less than 30,000 mm$^3$,
the outer core is formed from a crosslinked rubber composition that includes 100 parts by weight of a base rubber and 30 parts by weight or greater but 50 parts by weight or less of a co-crosslinking agent, the inner core is formed from a crosslinked rubber composition that includes 100 parts by weight of a base rubber and 23 parts by weight or greater but 45 parts by weight of less of a co-crosslinking agent, with the inner core co-crosslinking agent amount being at least 5 parts by weight less than that of the outer core,
the cover includes an inner layer cover and an outer layer cover positioned outside the inner layer cover, and
when:
a volume (mm$^3$) of the inner core is defined as Vc;
a volume (mm$^3$) of the mid layer is defined as Vm;
a Shore D hardness of the mid layer is defined as Hm;
a volume (mm$^3$) of the inner layer cover is defined as Vinc;
a Shore D hardness of the inner layer cover is defined as Hinc;
a volume (mm$^3$) of the outer layer cover is defined as Vouc;
a Shore D hardness of the outer layer cover is defined as Houc; and
a volume of the entire ball is defined as V,
the golf ball meets the following relational expressions (a) to (g):

$$0.02 \leq Vc/V < 0.07, \quad (a)$$

$$Hm > Hinc > Houc, \quad (b)$$

$$Hm - Houc > 25, \quad (c)$$

$$Vm > Vinc > Vouc, \quad (d)$$

$$(Vm + Vinc + Vouc)/V < 0.30, \quad (e)$$

$$Vm/Vouc > 1.50, \quad (f)$$

and $$(Vm*Hm)/(Vouc*Houc) > 3.0. \quad (g)$$

2. The golf ball according to claim 1, wherein the golf ball meets the following relational expression (h):

$$Vouc/V < 0.08. \quad (h)$$

3. The golf ball according to claim 1, wherein the hardness Houc is equal to or less than 36.

4. The golf ball according to claim 1, wherein the mid layer is formed from a resin composition, and a principal component of a base resin of the resin composition is selected from an ionomer resin, a polyamide resin, and a mixture thereof.

5. The golf ball according to claim 1, wherein the hardness Hm is equal to or greater than 68.

6. The golf ball according to claim 1, wherein
a JIS-C hardness Hs at a surface of the core is greater than a JIS-C hardness Ho at a central point of the core, and
a difference (Hs−Ho) between the hardness Hs and the hardness Ho is equal to or greater than 24.

7. The golf ball according to claim 1, wherein
the outer core is obtained by a rubber composition being crosslinked, and
the rubber composition includes a fatty acid and/or a fatty acid metal salt.

8. The golf ball according to claim 1, wherein the volume Vinc of the inner layer cover is equal to or greater than 3500 mm$^3$ but equal to or less than 4800 mm$^3$.

9. The golf ball according to claim 1, wherein the volume Vouc of the outer layer cover is equal to or greater than 1000 mm$^3$ but equal to or less than 3400 mm$^3$.

* * * * *